United States Patent Office 2,920,047
Patented Jan. 5, 1960

2,920,047

DEFOAMING AND DEMULSIFICATION

Robert C. Hyatt, Cranford, N.J., and Anthony J. Martinelli, Easton, Pa., assignors to General Aniline & Film Corporation, New York, N.Y., a corporation of Delaware No Drawing. Application December 30, 1954
Serial No. 478,873

2 Claims. (Cl. 252—340)

This invention relates to the provision of a new process for resolving emulsions of the water-in-oil type and inhibiting foaming of liquid systems.

Various liquid systems exist in industry which are in the form of water-in-oil type emulsions which must be separated into their component parts of oil and water. Prime examples of such liquid systems are the petroleum emulsions commonly referred to as "cut oil," "roily oil," "emulsified oil," etc., which are obtained from producing wells, pipe lines, from the bottoms of oil storage tanks and the like, and comprise fine droplets of naturally occurring waters or brines dispersed in a more or less permanent state through the oil which constitutes the continuous phase of the emulsion. Water-in-oil type emulsions are also formed under controlled conditions in processes for removing impurities, particularly inorganic salts, from pipe line oil. Other water-in-oil type emulsions encountered in nature or industry include gas tar emulsions, tar sand oil emulsions, emulsions encountered in the manufacture of anti-biotic agents, and in the sweetening or caustic washing of hydrocarbons, and the like.

Various liquid systems of an aqueous or non-aqueous type are also found in industry which are subject to undesirable foaming during manufacture and/or use. Such liquid systems may be of the solution or dispersion type, the term "dispersion" being here employed generically to include emulsions of one liquid in another, suspensions of a solid in a liquid, and the like. By way of example, undesirable foaming may be encountered in the production and/or use of natural or synthetic rubber latices, rubber latex base paints, plastic latices, dyestuff preparations, pharmaceutical preparations such as penicillin which is made by aerobic fermation, paper pulp in aqueous slurries, glue solutions, drilling muds, materials used in textile finishing operations such as in the application of insoluble finishing compositions, e.g. water-proofing emulsions, and the like.

Both of the problems above described have as a common characteristic an undesirable discontinuous phase. Thus, in the water-in-oil emulsions, the discontinuous water phase must be agglomerated and removed, while in the foaming of various liquid systems, it is the discontinuous air phase in the bubbles of the foam which must be agglomerated and removed or at least its formation prevented. It is accordingly an object of this invention to provide a process for agglomerating, separating, preventing, and/or inhibiting the formation of such discontinuous phases. Other objects and advantages will appear as the description proceeds.

It has now been found that the aforementioned emulsions and foaming problems may be solved by treatment of the liquid system which contains the water-in-oil emulsion and/or is subject to foaming with an agent which may be represented by the general formula

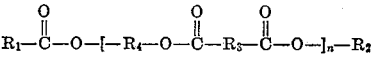

wherein $R_1$ is a radical of from 1 to 18 carbon atoms; $R_3$ is a radical of from 1 to 8 carbon atoms; $R_4$ is selected from the group consisting of divalent alkyl radicals derived from alkanediols of from 2 to 6 carbon atoms at least 50 mole percent of which are $\alpha,\omega$ alkenediols; $R_2$ is selected from the group consisting of —H, —$R_4$—OH and

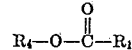

and $n$ has a value of about 2 to 15. These agents may be described as at least partially acylated polyesters of dicarboxylic acids and alkanediols.

Such agents may be prepared by reaction between a dicarboxylic acid of the formula HOOC—$R_3$—COOH, an alkanediol of the formula HO—$R_4$—OH, and a monocarboxylic acid of the formula $R_1$—COOH, wherein $R_1$, $R_3$ and $R_4$ have the values given above. The value of $n$ will depend upon the molecular proportions of reactants employed, the reaction conditions, and the stage at which the monocarboxylic acid $R_1$—COOH is added to the reaction medium. It will be understood, that regardless of the proportions of reactants employed, the polymeric product will not consist of a single material, compound or ester, but of a mixture of polymers of varying chain length and end group composition, combined with small amounts of unreacted monomers and simple esters. In most cases, it is preferred to react the dicarboxylic acid with at least an equimolar amount of the alkanediol in the production of the polyester. In general, proportions of about 1 to 2 moles of alkanediol for each mole of dicarboxylic acid may be employed, whereby the resulting polymer mixture will contain as its greatest component polyester chains having hydroxy groups at both ends. However, as mentioned above, it will be apparent that polyester chains will be present having terminal carboxy groups and/or both a hydroxy and a carboxy terminal group. The greater the proportion of alkane diol, the greater the proportion of polyester chains in the product containing two terminals hydroxy groups.

The monocarboxylic acid $R_1$—COOH which is employed for partial acylation of the hydroxy containing polyester chains may be added to the reaction medium at the beginning of the reaction, during the reaction or after the alkanediol and dicarboxylic acid have been reacted. When added before or during the polyester formation, the presence of the monocarboxylic acid in the reaction medium will obviously tend to shorten the length of the polyester chains by blocking further reaction of terminal hydroxy groups with carboxy groups of the dicarboxylic acid.

The reaction for producing the agents operative in the instant invention may be carried out in a manner conventional for esterification procedures at temperatures ranging from about 100° to 275° C., preferably 130 to 220° C., for a sufficient period of time to complete the reaction. Durations are generally of from about 2 to 12 or 14 hours depending upon whether the monocarboxylic acid is initially present in the polyesterification medium or is subsequently reacted with the polyester products, the nature and concentration of the reactants, reaction conditions and the like. The use of an inert atmosphere such as nitrogen assists in producing an acceptable product while at the same time aiding in removal of the water of condensation. Carbon dioxide which at the same time acts as a catalyst for the reaction may also be employed. An esterification catalyst is not necessary, but may be employed if desired. Suitable esterification catalysts include p-toluene sulfonic acid, sulfuric acid, $\beta$-camphor sulfonic acid, sodium hydroxide, or the like. If desired, activated carbon such as Nuchar may be employed during any desired stage of the reaction to improve the quality of the product. The use of a vacuum in conjunction with nitrogen and/or $CO_2$ as an inert atmosphere is likewise beneficial. In this manner all volatile materials, including water vapor and/or excess alkanediol or the like may be removed by distillation, preferably at a temperature ranging from about 150 to 300 C. and a pressure of 10 mm. of mercury or less for periods of 1 to 4 hours.

Similar considerations apply to the acylation reaction when the monocarboxylic acid is subsequently added. Temperatures of about 100 to 300° C. may be employed in conjunction with concurrent and/or subsequent vacuum treatment, if desired under nitrogen, to remove excess components including excess acid by distillation.

Alkanediols which may be employed for reaction with the dicarboxylic acid include 1,4-butanediol, 2,5-pentanediol, 1,4-hexanediol, and 2,5-hexanediol. Other operative alkanediols which may be employed in admixture with the aforementioned alkanediols include ethylene glycol, 1,2-propylene glycol, 1,3-propylene glycol, 1,2-butanediol, 2-methyl-2,3-butanediol, 2,4-pentanediol, 2-methyl-1,3-pentanediol, 3-ethyl-1,3-hexanediol, 2,4-hexanediol, 1,6-hexanediol and the like. In all cases, at least 50 mole percent of the alkanediols employed should be $\alpha,\omega$ alkanediols in order to produce the improved agents operative in the instant invention.

Suitable dicarboxylic acids which may be employed for reaction with the alkanediols mentioned above include malonic, succinic, glutaric, adipic, pimelic, azelaic, sebacic, oxydibutyric, diglycollic, phthalic, terephthalic, isophthalic, tetrahydrophthalic acids, and/or mixtures thereof or the like.

It will be understood from the above that whenever mixtures of alkanediols and/or dicarboxylic acids are reacted together, the polymeric products will contain polyester chains containing varying amounts of the reactants. In other words, in the formula given above, the recurring units in the compound as indicated by the portion in brackets may contain different values for $R_3$ and $R_4$ depending upon the reactants employed. However, it has been found that polyesters prepared from adipic acid as the dicarboxylic acid and a mixture of about equimolar amounts of 1,4-butanediol and 1,2-propylene glycol are generally superior in producing the desired results. In the preferred embodiment the polyester is formed from about 3 moles of adipic acid, 2 moles of 1,4-butanediol and 2 moles of 1,2-propylene glycol.

Monocarboxylic acids of from 2 to 19 carbon atoms which may be employed for acylating the hydroxy-chain ended polyesters include acetic, acetic anhydride, acrylic, vinyl acetic, propionic, cyclopropane carboxylic acid, butyric, 2-ethyl-1-hexanoic, allylacetic, valeric, tiglic, caproic, enanthic, caprylic, pelargonic, angelic, capric, hendecanoic, oleic, ricinoleic, lauric, erucic, palmitic, margaric, stearolic, stearic, benzoic, mono-2-ethylhexylphthalate acids or the like. Aliphatic acids of at least 9 carbon atoms are preferred. It will be understood that here also, mixtures of any of these acids may be employed, the resulting products being mixtures of the corresponding acylated polyesters. The proportion of acylated polyester chains having a terminal hydroxy group will of course be decreased as the molar ratio of acylating monocarboxylic acid to polyester chain is increased.

It will be understood that in preparing the agents of this invention, the functional equivalents of the acids may be employed, as for example their anhydrides, halides, salts or the like. Similarly, functional equivalents of the final agents, such as their salts or the like, may be used in place of the agents per se.

The instant invention may be put into practice for demulsification by simply introducing a relatively small proportion of an agent of the type described above into a relatively large proportion of water-in-oil emulsion, admixing the agent and emulsion with agitation in any of the various types of apparatus now generally used to resolve or break petroleum emulsions with a chemical reagent, preferably with application of heat, and allowing the mixture to stand quiescent until the undesirable water content of the emulsion separates and settles from the mass. Slight agitation in the water layer at this point is helpful in breaking "webbing" that sometimes forms. The agent may be added directly or it may be first dissolved in or diluted with any suitable liquid medium to produce a concentrate or the like. As suitable solvents and diluents there may be mentioned water, petroleum hydrocarbons, benzene, toluene, xylene, aliphatic alcohols such as methyl alcohol, ethyl alcohol, denatured alcohol, propyl alcohol, isopropyl alcohol, butyl alcohol, octyl alcohol, mixtures thereof, and the like. Said agent may be employed as the sole demulsifier or it may be employed in admixture with other suitable well known types of demulsifying agents. The solubility of the agent in the oil or water of the emulsion to be treated is not particularly important in view of the very small amounts employed. Thus, concentrations of agent of the order of from about 10 to 100 parts per million (p.p.m.) in the emulsion, by volume, are usually sufficient although concentrations outside of this range may in some cases be effective and economically feasible.

The examples in the following tables are illustrative of the instant invention and are not to be regarded as limitative.

The examples in Table 1 below illustrate various agents of the type above described, tested and found operative to a greater or lesser degree for demulsification of water-in-oil emulsions. In these demulsification tests, 1.0 ml. and 0.5 ml. of a 1 percent solution of the agent in a solvent mixture of 50 parts by weight of xylene and 50 parts by weight of the isopropyl alcohol were added to 100 ml. of the crude oil emulsion (e.g. Hastings, Skyrock Lease Well #3, Aquaness Co.) in a 4-ounce round bottle. The admixtures, in capped bottles were shaken for 15 minutes on a mechanical shaker. After removal, the bottles were allowed to stand quiescent for 15 minutes. Color of sample and any separation or water-drop were noted and the bottles then immersed in a water bath at 60° C. for 10 minutes. Water separation was noted, the bottles returned to the mechanical shaker for another 10 minutes, removed and allowed to stand quiescent for another 15 minutes. Color and water-drop (water separation) were noted and the bottles then slightly agitated by swirling the contents to break the webbing that forms in a water layer.

TABLE I

*Demulsification Tests*

| Example | Reactants Used in Making the Complex Partially Acylated Esters |
|---|---|
| 1 | 1.33 moles of 1,4-butanediol. <br> 1.33 moles of 1,2-propylene glycol. <br> 2.0 moles of adipic acid. <br> 0.5 moles of Neo-Fat 11. |
| 2 | 1.33 moles of 1,4-butanediol. <br> 1.33 moles of 1,2-propylene glycol. <br> 2.0 moles of adipic acid. <br> 0.5 moles of DD coconut fatty acids. |
| 3 | 1.33 moles of 1,4-butanediol. <br> 1.33 moles of 1,2-propylene glycol. <br> 2.0 moles of adipic acid. <br> 0.4 moles of DD coconut fatty acids. <br> 0.1 moles of benzoic acid. |
| 4 | 1.33 moles of 1,2-propylene glycol. <br> 1.33 moles of 1,4-butanediol. <br> 2.0 moles of adipic acid. <br> 0.4 moles of Neo-Fat 11. <br> 0.1 moles of benzoic acid. |
| 5 | 1.33 moles of 1,4-butanediol. <br> 1.33 moles of 1,2-propylene glycol. <br> 2.0 moles of adipic acid. <br> 0.4 moles of DD coconut fatty acids. <br> 0.1 moles of oleic acid. |
| 6 | 1.33 moles of 1,4-butanediol. <br> 1.33 moles of 1,2-propylene glycol. <br> 2.0 moles of adipic acid. <br> 0.4 moles of DD coconut fatty acids. <br> 0.1 moles of 2-ethyl-1-hexanoic acid. |
| 7 | 1.33 moles of 1,4-butanediol. <br> 1.33 moles of 1,2-propylene glycol. <br> 1.33 moles of adipic acid. <br> 0.67 moles of terephthalic acid. <br> 0.5 moles of DD coconut fatty acids. | agents are listed in the following Table II from information obtained from Armour and Company.

TABLE II

| Old Name | DD Coco Fatty Acids | Neo Fat 9 or 15 | Neo Fat 11 | Fractionated Tall Oil | |
|---|---|---|---|---|---|
| | | | | Neo Fat D-142 | |
| New Name | Neo Fat 265 | Neo Fat 10 | Neo Fat 12 | Neo Fat 42-06 | |
| Caprylic Acid...........percent.. | 8 | 3 | | |
| Capric Acid................do.... | 7 | 92 | 1 | |
| Lauric Acid................do.... | 49 | 5 | 95 | |
| Myristic Acid..............do.... | 17 | | 4 | |
| Palmitic Acid..............do.... | 9 | | | |
| Stearic Acid...............do.... | 2 | | | |
| Oleic Acid.................do.... | 6 | | | 50 |
| Linoleic Acid..............do.... | 2 | | | 40 |
| Linolenic Acid.............do.... | | | | 4 |
| Rosin Acids................do.... | | | | 6 |
| Titre......................°C.. | 22-26 | 28-33 | 41-43 | 17 |
| Iodine Value.................... | 14 | 1.2 | 1.0 | 125 |
| Acid Value max.................. | 272 | 329 | 282 | 198 |

TABLE I.—Continued

| Example | Reactants Used in Making the Complex Partially Acylated Esters |
|---|---|
| 8 | 1.33 moles of 1,4-butanediol. <br> 1.33 moles of 1,2-propylene glycol. <br> 2.0 moles of adipic acid. <br> 0.3 moles of DD coconut fatty acids. <br> 0.2 moles of 2-ethyl-1-hexanoic acid. |
| 9 | 1.33 moles of 1,4-butanediol. <br> 1.33 moles of 1,2-propylene glycol. <br> 2.0 moles of adipic acid. <br> 0.4 moles of DD coconut fatty acids. <br> 0.05 moles of phthalic anhydride. |
| 10 | 1.33 moles of 1,4-butanediol. <br> 1.33 moles of 1,2-propylene glycol. <br> 1.6 moles of adipic acid. <br> 0.4 moles of terephthalic acid. <br> 0.5 moles of DD coconut fatty acids. |

EXAMPLE II

Adipic acid, 1,4-butanediol and 1,2-propylene glycol in molar proportions of, respectively, 3:2:2 were charged into a 4-necked flask equipped with thermometer, nitrogen inlet, sealed stirrer, and short Vigreaux distilling head connected to a condenser. After purging with nitrogen, the reaction mixture was heated at 150° to 212° C. for 6 hours while removing water by distillation as it was formed. The product was transferred to a still pot equipped with capillary inlet for dry, oxygen-free nitrogen, and heated in vacuo at 200° to 250° C. and 5 mm. of mercury for ¾ hour to remove excess propylene glycol and butanediol. After cooling, 0.75 moles of Neo-Fat 11 were added and the mixture heated at 140° to 210° C. for 4¼ hours and then at 200° to 250° C. and 5 mm. of mercury for 1 hour. A pale yellow viscous liquid was obtained having a molecular weight of about 1400.

Dow 512-O is a latex containing 45% by weight of styrene-butadiene copolymer. Dow 744-B is a latex containing 50% by weight of vinyl chloride-vinylidene chloride copolymer. Rhoplex-WC-9 is a latex of Rhom and Haas containing 40% by weight of acrylic ester polymer. Compositions of certain monocarboxylic acid acylating agents are listed in the following Table II from information obtained from Armour and Company.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A process for breaking a water-in-oil emulsion comprising subjecting the emulsion to the action of a mixture of agents of the formula

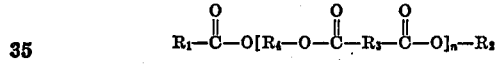

wherein $R_1$ is the hydrocarbon radical of lauric acid, $R_3$ is the hydrocarbon radical of adipic acid, $R_2$ is selected from the group consisting of —H, —$R_4$—OH and

$n$ has a value of about 2 to 15, and $R_4$ is a hydrocarbon radical derived from a mixture of alkanedoils at least 50 mole percent of which is 1,4-butanediol and the balance is 1,2-propylene glycol.

2. A process as defined in claim 1 wherein said mixture contains about equimolar amounts of 1,4-butanediol and 1,2-propylene glycol.

References Cited in the file of this patent

UNITED STATES PATENTS

| 2,052,282 | DeGroote | Aug. 25, 1936 |
| 2,214,784 | Wayne | Sept. 17, 1940 |
| 2,514,399 | Kirkpatrick et al. | July 11, 1950 |
| 2,562,878 | Blair | Aug. 7, 1951 |
| 2,599,538 | Blair | June 10, 1952 |
| 2,686,766 | Silverstein et al. | Aug. 17, 1954 |